May 15, 1951 W. HOCHWALD 2,552,968

RANDOM PULSE SYNCHRONIZER

Filed Sept. 13, 1949 2 Sheets-Sheet 1

INVENTOR.
WALTER HOCHWALD

BY William R. Lane
ATTORNEY

RANDOM PULSE SYNCHRONIZER

Filed Sept. 13, 1949 2 Sheets-Sheet 2

INVENTOR.
WALTER HOCHWALD

BY William R Lane

ATTORNEY

Patented May 15, 1951 2,552,968

UNITED STATES PATENT OFFICE 2,552,968

RANDOM PULSE SYNCHRONIZER

Walter Hochwald, Inglewood, Calif., assignor to North American Aviation, Inc.

Application September 13, 1949, Serial No. 115,340

6 Claims. (Cl. 250—27)

This invention relates to counting or otherwise dealing with a plurality of pulse trains having a random frequency distribution. It particularly pertains to the problem of feeding a plurality of random pulse inputs to a single digital machine.

In order that a binary electronic counter may count pulses from more than one source it is necessary that the pulses from the two sources be sufficiently out of phase so that no two pulses from separate sources arrive at the counter at a time. If such a coincidence would occur, the counter would sense only one pulse, when in reality two had been furnished.

It is an object of this invention to provide a device for preventing the coincidence of a plurality of random pulse inputs to a binary electronic counter or any other digital device.

It is a further object of this invention to provide a device adapted to produce a number of output pulses equal to the sum of a plurality of trains of random frequency input pulses.

It is a further object of this invention to provide a device adapted to produce output pulses equal in number to the sum of a plurality of trains of random frequency input pulses and predeterminately phased.

It is a further object of this invention to provide means for synchronizing a plurality of random pulse inputs to a constant frequency clock pulse.

It is a further object of this invention to provide a random pulse synchronizer which is highly accurate, reliable and dependable in operation.

Figure 1:
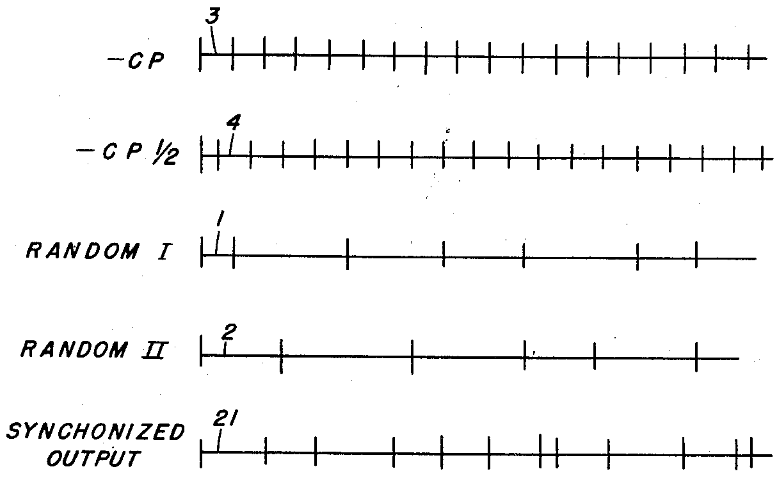
Figure 2:
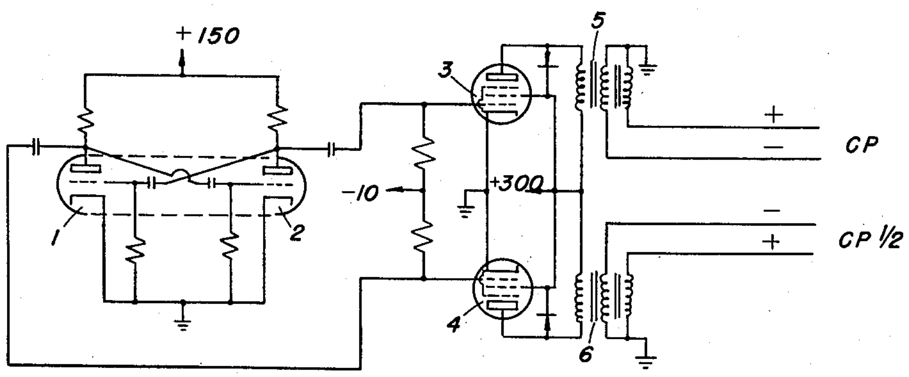
Figure 3:
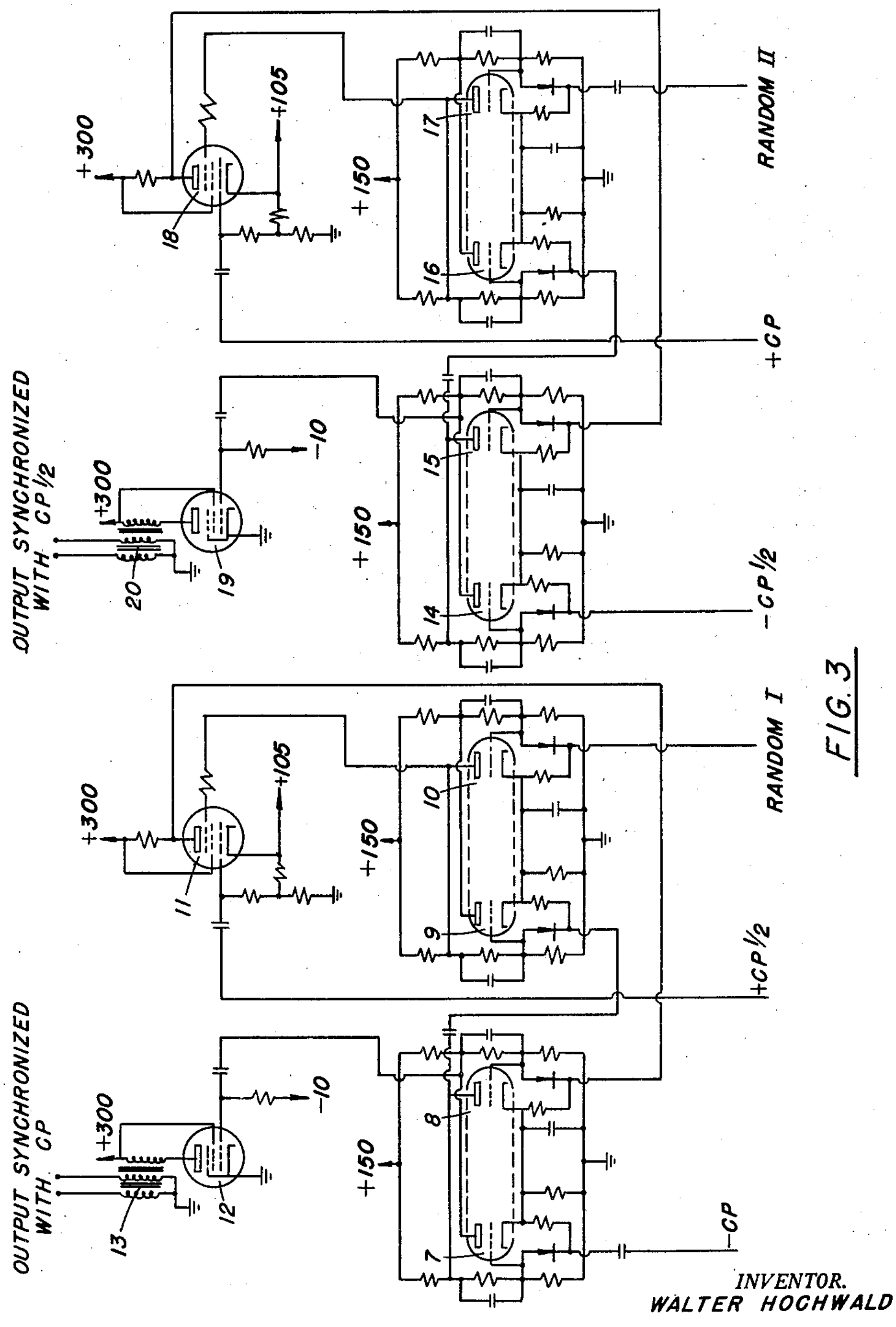

Other objects of invention will become apparent from the following description taken in connection with the accompanying drawings in which:

Fig. 1 is a graph of the pulse inputs and outputs of the device, with amplitude plotted as ordinates and time as abscissae;

And Figs. 2 and 3 are circuit diagrams of the invention.

Referring to Fig. 1, a series of random frequency pulses is shown on line 1. A second series of random frequency pulses is shown on line 2, and constant frequency clock pulses are shown on lines 3 and 4, said clock pulses having a fixed frequency at least double the maximum frequency of the random pulses and being mutually out of phase.

In Fig. 1 if it is assumed that the pulses shown on lines 1 and 2 are to be counted by a single electronic binary counter or dealt with in a single digital machine, means must be provided for preventing such coincidence in arrival time as is indicated by the fourth pulse on line 1 and the third pulse on line 2, and the sixth pulse on line 1 and the fifth pulse on line 2. If these two trains of pulses were applied to an electronic binary counter in "raw form" it can be seen that the counter would be in error by the number of such coincidences. To prevent such an error this invention is provided. Clock pulses having a fixed frequency at least double the maximum frequency of the random pulses to be "de-synchronized" are generated. A second clock pulse train having the same fixed frequency as the one hereinbefore described is generated with a predetermined fixed phase lag between it and its counterpart. An electronic synchronizer is then provided, which depends for its output not only upon the random pulse input but also upon pulses furnished from the clock-pulse trains. The output of the synchronizer whose circuit diagram is shown in Figs. 2 and 3 is therefore locked in step with the clock pulses, and no pulses are delivered to the counter or other digital device which are not locked in synchronism with the clock pulses.

Referring to Figs. 2 and 3, the clock pulses are produced by a free running multivibrator comprising triodes 1 and 2 connected by resistances and capacitances as shown. Since the grids and plates are cross-connected as indicated in Fig. 2, the plate of one tube goes negative when the plate of the other tube goes positive, and vice versa. The phase relationship of the outputs of the two plates is therefore a complete opposition. Pulses 180 degrees out of phase with each other are thus furnished to pentodes 3 and 4 which feed pulse transformers 5 and 6 having dual output windings provided to yield pulses of opposite polarity from each pentode. The clock pulses from pentode 3 will be denoted CP pulses, and the pulses from pentode 4 will be denoted CP½ pulses to indicate that the two trains of pulses are 180 degrees out of phase. The apparatus so far described may be replaced by any convenient source of constant frequency pulses, the phase relationship of which may be controlled or predetermined.

The synchronizer proper comprises triodes 7 and 8 connected by resistances, capacitances and diodes as shown to form a first bi-stable multivibrator or "flip-flop," and triodes 9 and 10 similarly connected to form a second "flip-flop." Gating pentode 11 is connected to the output of triode 10, and feeds the input to triode 8, while output pentode 12 is fed from the output of triode 7. The output of pentode 12 is fed through pulse transformer 13 to the binary counter or other digital device whose input must be synchronized. In a similar way, a second synchronizer is comprised of triodes 14, 15, 16 and 17, and pentodes 18 and 19. The output of pentode 19 feeds the input of the same digital device or electronic counter with pulses synchronized to the CP½ pulses through pulse transformer 20, while the output of pulse transformer 13 is synchronized with the CP pulses.

In operation random pulses are applied to triodes 10 and 17. It is assumed that the right-hand triodes in each bi-stable multivibrator or "flip-flop" are initially in condition to conduct. It can be demonstrated by reference to the manner of application of the clock pulses that the right-hand triodes in each bi-stable multivibrator are always in condition to conduct the instant before the random pulses are applied. Application of a random pulse to triode 10 therefore cuts off conduction of the triode and causes a positive gating voltage to appear on the suppressor grid of pentode 11. Pentode 11 acts as a gate, and the appearance of a positive gating voltage on its suppressor grid acts to open the gate. Assuming that the arrival of random pulses and clock pulses is as shown in Fig. 1, and that we are now speaking of the random pulses shown on line 1 as being applied to triode 10, it can be seen that the next pulse to arrive at the synchronizer after the first random pulse on line 1 is a CP½ pulse which is applied to the control grid of pentode 11. Since pentode 11 is open, a pulse is passed from its plate to the grid of triode 8 in the first "flip-flop." This tube being in condition to conduct, a positive pulse appears on the plate of triode 8 and is conducted to the grid of triode 9 in the second "flip-flop." Since triode 9 was put in condition to conduct by the first random pulse, this positive pulse has no effect since the tube is already conducting. The next pulse to appear is the next CP pulse on line 3 in Fig. 1. This pulse, as is shown in Fig. 2, is applied to the grid of triode 7, which was put in condition to conduct by the pulses transmitted from pentode 11 applied to the grid of triode 8. A positive pulse on the plate of triode 7 is then conducted through output amplifier pentode 12 and pulse transformer 13. Pentode 12 is biased as shown in order to transmit only positive pulses. This pulse is synchronized with the CP pulse applied to triode 7. When the plate of triode 7 goes positive, the plate of triode 8 goes negative, placing a negative pulse on the grid of triode 9 and stopping its conduction. This causes conduction of triode 10, and the right-hand halves of each bi-stable multivibrator are then again in condition to conduct and are ready for the reception of another random input pulse. Therefore, a pulse appears on the output of the synchronizer which is shown in line 21 of Fig. 1. The operation of the synchronizer of which triodes 14, 15, 16 and 17 are a part is identical with that just described, except that the output is synchronized with the CP½ pulses, and the result of applying two random frequency pulse trains to the two synchronizers is shown on line 21 in Fig. 1.

In a similar manner, any number of random frequency pulse trains may be synchronized by the provision of an equal number of synchronizers constructed as shown in Fig. 2. The clock pulses need only be predeterminately out of phase, and need not be separated by 180 degrees.

There is thus provided a convenient means for feeding many random frequency pulse trains into a binary electronic counter or other digital device for the purpose of counting or otherwise dealing with the random pulse inputs.

Although the invention has been described and illustrated in detail, it is to be clearly understood that the same is by way of illustration and example only and is not to be taken by way of limitation, the spirit and the scope of this invention being limited only by the terms of the appended claims.

I claim:

1. Means for synchronizing two random frequency electrical pulses comprising two bi-stable multivibrators, means for generating two constant frequency pulse trains mutually out of phase and having a frequency at least double the maximum frequency of said random frequency pulses, electronic gating means operable only in response to said random frequency pulses for allowing said constant frequency pulses to recycle said bi-stable multivibrators, and output amplifier means operatively connected to one of said bi-stable multivibrators whereby a number of output pulses equal in number to said random pulses is produced in phase with said constant frequency pulses.

2. Synchronizing means comprising a gating tube, a bi-stable multivibrator adapted to supply gating voltage to said gating tube in response to random frequency input pulses, means for generating two constant frequency mutually out of phase pulse trains with frequencies at least double the maximum frequency of said random frequency pulses, a second bi-stable multivibrator adapted to receive the first of said constant frequency pulse trains directly on the grid of one of its triodes and to receive the second of said constant frequency pulse trains on the grid of the other of its triodes through said gating tube, and output amplifier means connected to said second bi-stable multivibrator and biased to yield an output pulse of only one polarity, said second bi-stable multivibrator being connected to reset said first bi-stable multivibrator when it delivers a pulse to said output amplifier means to thereby synchronize said random pulse input to said constant frequency pulses.

3. A device as recited in claim 2 in which said means for generating constant frequency pulses is a free-running multivibrator adapted to furnish constant frequency pulses 180 degrees out of phase and further comprising a second gating tube, a third bi-stable multivibrator adapted to supply gating voltage to said second gating tube in response to random frequency input pulses, a fourth bi-stable multivibrator adapted to receive said second constant frequency pulse train directly on the grid of one of its triodes and to receive the first of said constant frequency pulse trains on the grid of the other of its triodes through said second gating tube, and a second output amplifier means connected to said fourth bi-stable multivibrator and biased to yield an output pulse of only one polarity, said fourth bi-stable multivibrator being connected to reset said third bi-stable multivibrator when it delivers a pulse to said second output amplifier means to thereby synchronize said random pulse inputs to constant frequency pulses 180 degrees out of phase.

4. Means for synchronizing a plurality of trains of random frequency pulses comprising means for generating a plurality of trains of predeterminately phased constant frequency pulses having a frequency at least double the maximum frequency of said random frequency pulse trains, a plurality of electronic gating means each operable by one of said random frequency pulse trains, a plurality of bi-stable electronic means adapted to be set and reset by pairs of said constant frequency pulse trains and adapted for control by said gating means and output amplifier means connected to each of said bi-stable means whereby each of said random frequency pulse trains is synchronized to one of said constant frequency pulse trains.

5. A device as recited in claim 4 in which said bi-stable means comprise bi-stable multivibrators and in which said gating means comprise electronic gating tubes and bi-stable multivibrators for supplying gating voltage to said tubes in response to said random pulse trains, said bi-stable multivibrators being reset by said bi-stable electronic means whenever a pulse is delivered to said output amplifier means.

6. Means for preventing the coincidence of a plurality of random pulse inputs comprising two bi-stable multivibrators for each said random pulse input, means for producing a plurality of trains of pulses bearing a fixed phase relation to each other and having a constant frequency at least double the maximum frequency of said random pulse inputs, an electronic gating tube connected between the bi-stable multivibrators in each pair, each of said random pulses being connected to set one bi-stable multivibrator of each pair, two of said constant frequency pulses being connected to set and reset, respectively, the second of said multivibrators, said second multivibrator in each pair being connected to deliver an output pulse synchronized with its reset pulse and to reset said first-named multivibrator and said constant frequency pulses being so connected to said multivibrators that the reset pulses applied to said second bi-stable multivibrator of each pair are never in phase whereby said random pulse inputs are synchronized with pulses always out of phase with each other, thus preventing coincidence of said random pulses.

WALTER HOCHWALD.

REFERENCES CITED

The following references are of record in the file of this patent:

Article, "Electronic Computing Circuits of the ENIAC," part consisting of paragraphs III–IV, pages 757–760, Proceedings of the IRE for August 1947.